US008847101B2

(12) United States Patent
Begounov et al.

(10) Patent No.: US 8,847,101 B2
(45) Date of Patent: Sep. 30, 2014

(54) DEVICE AND METHOD FOR GENERATING A PLASMA FLOW

(75) Inventors: Stanislav Begounov, Cheseaux-Noréaz (CH); Sergey Goloviatinski, Cortaillod (CH); Ioulia Tsvetkova, Cheseaux-Noréaz (CH)

(73) Assignee: Advanced Machine Sarl, Lausanne (CH)

( * ) Notice: Subject to any disclaimer, the term of this patent is extended or adjusted under 35 U.S.C. 154(b) by 410 days.

(21) Appl. No.: 12/998,872

(22) PCT Filed: Dec. 8, 2009

(86) PCT No.: PCT/IB2009/055571
§ 371 (c)(1), (2), (4) Date: Jun. 9, 2011

(87) PCT Pub. No.: WO2010/067306
PCT Pub. Date: Jun. 17, 2010

(65) Prior Publication Data

US 2011/0240460 A1 Oct. 6, 2011

(30) Foreign Application Priority Data

Dec. 9, 2008 (CH) ....................................... 1932/08

(51) Int. Cl.
*B23K 10/00* (2006.01)
*H05H 1/34* (2006.01)
*H05H 1/32* (2006.01)

(52) U.S. Cl.
CPC . *H05H 1/34* (2013.01); *H05H 1/32* (2013.01); *H05H 2001/3494* (2013.01)
USPC .............. 219/121.36; 219/121.51; 219/121.5; 219/121.59; 219/121.54

(58) Field of Classification Search
CPC .... H01H 1/32; H01H 1/34; H05H 2001/3494
USPC ............... 219/121.39, 121.48, 121.51, 121.5, 219/121.54, 74, 75; 313/231.41, 231.51
See application file for complete search history.

(56) References Cited

U.S. PATENT DOCUMENTS 3,515,839 A 6/1970 Gejo et al.
3,914,573 A 10/1975 Muehlberger (Continued)

FOREIGN PATENT DOCUMENTS

EP 0 342 388 A2 11/1989
EP 0 994 637 A2 4/2000
WO WO 96/04098 A1 2/1996

OTHER PUBLICATIONS

Kiyozumi et al.; Surface Treatment of Plastics by Plasmajet; Journal of Adhesion Society of Japan, vol. 6, No. 4 (1970); pp. 1-12.

*Primary Examiner* — Mark Paschall
(74) *Attorney, Agent, or Firm* — Krieg DeVault LLP; Brad A. Schepers

(57) ABSTRACT

The invention relates to a device generating a plasma flow comprising an electrically conductive housing, tubular in shape, forming a central channel traversed by a vortex gas, a central electrode arranged coaxially in said channel and an electric power source intended to apply an electric voltage V between the electrode and the housing, characterized in that the mean diameter of the channel formed by the housing decreases progressively from an area situated substantially at the level of the free end of the electrode as far as an end area of said housing, said end area being configured in such a way that the minimum electric voltage Vcmin(0) to be applied in order to develop an electric arc between said electrode and said end area is strictly greater than said voltage V.

14 Claims, 2 Drawing Sheets

(56) References Cited

U.S. PATENT DOCUMENTS

| | | | | |
|---|---|---|---|---|
| 5,233,154 | A * | 8/1993 | Horiai et al. | 219/121.48 |
| 5,591,356 | A * | 1/1997 | Sakuragi et al. | 219/121.5 |
| 5,965,040 | A * | 10/1999 | Luo et al. | 219/121.5 |
| 6,265,690 | B1 * | 7/2001 | Fornsel et al. | 219/121.5 |
| 7,690,539 | B1 * | 4/2010 | Tudor et al. | 222/459 |
| 2003/0047540 | A1 | 3/2003 | Konavko et al. | |

* cited by examiner

DEVICE AND METHOD FOR GENERATING A PLASMA FLOW

This application claims the benefits under 35 U.S.C. 119 (a)-(d) or (b), or 365(b) of International Application No. PCT/IB2009/055571, filed 8 Dec. 2009, and Swiss Patent Application No. 01932/08, filed 9 Dec. 2008.

TECHNICAL FIELD

The present invention relates to a device and method for generating a plasma flow having a low temperature and a relatively high power.

STATE OF THE ART

In the area of surface treatment the use of a plasma flow is known so as to, among others, weld surfaces or cut surfaces. Such applications of a plasma flow have been described in particular in the U.S. Pat. No. 3,515,839. However, in this state of the art, the plasma flow created has a very high temperature. This plasma flow is not therefore suitable for the treatment of surfaces sensitive to heat such as plastic for example. The use is likewise known of a plasma flow for treating plastic surfaces so as to increase their wettability. Such an application has been described in particular in the article "Surface Treatment of Plastics by Plasmajet", published in the Journal of the Adhesion Society of Japan, Volume 6, No. 4, 2 Aug. 1968. In this document, the plasma flow is generated by applying a voltage between a cathode formed by a bar in thoriated tungsten and an anode forming the body of the plasma nozzle. Moreover, a flow of argon gas circulates in the free space separating the anode and the cathode so as to develop the electric arc formed between these two electrodes as far as an exit opening of the nozzle. However, in this document, the mean temperature of the plasma jet is around 5500° K which is still too high for the surface treatment applications foreseen by the present invention.

DISCLOSURE OF THE INVENTION

The present invention therefore aims to propose a device and a method for generating a plasma flow whose temperature is low while having a relatively high power.

For this purpose, in accordance with the invention, a device is proposed for generating a plasma flow comprising an electrically conductive housing, tubular in shape, forming a central channel traversed by a vortex gas, a central electrode arranged coaxially in said channel and an electric power source intended to apply an electric voltage V between the electrode and the housing, characterised in that the mean diameter of the channel formed by the housing decreases progressively from an area situated substantially at the level of the free end of the electrode as far as an end area of said housing, said end area being configured in such a way that the minimum electric voltage Vcmin(0) to be applied in order to develop an electric arc between said electrode and said end area is strictly greater than said voltage V.

Configured in this way, the device according to the invention allows the limitation of the development of an electric arc inside a conductive housing to an end area positioned just before the opening of the housing intended to deliver the plasma flow on the workpiece to be treated. Indeed, the end area is configured in such a way as to develop an electric arc with the central electrode only starting from a certain minimum voltage. In this way, by applying a voltage lower than said minimum voltage, the electric arc is developed inside the central channel of the housing until approaching, or even reaching, said end area, then withdraws sharply in the direction of the central electrode. Subsequently, it resumes its development inside the channel in the direction of said end area until it withdraws again. In the end, this sequence of development and of withdrawal of the electric arc generates a relatively powerful plasma flow yet whose temperature is relatively low to allow its use in numerous surface treatment applications.

Configured in this way, the method according to the invention allows the creation of a sequence of phases of development and of phases of withdrawal of an electric arc inside the central channel of a conventional plasma nozzle so as to generate in the end a plasma flow having a low temperature and a relatively high power.

BRIEF DESCRIPTION OF THE DRAWINGS

Other advantages and features of the present invention will be better understood from reading a particular embodiment of the invention and with reference to the drawings, in which:

FIG. 2*b* shows a front view of the end area shown in FIG. 2*a;*

DETAILED DESCRIPTION OF AN EMBODIMENT OF THE INVENTION

Figure 1:
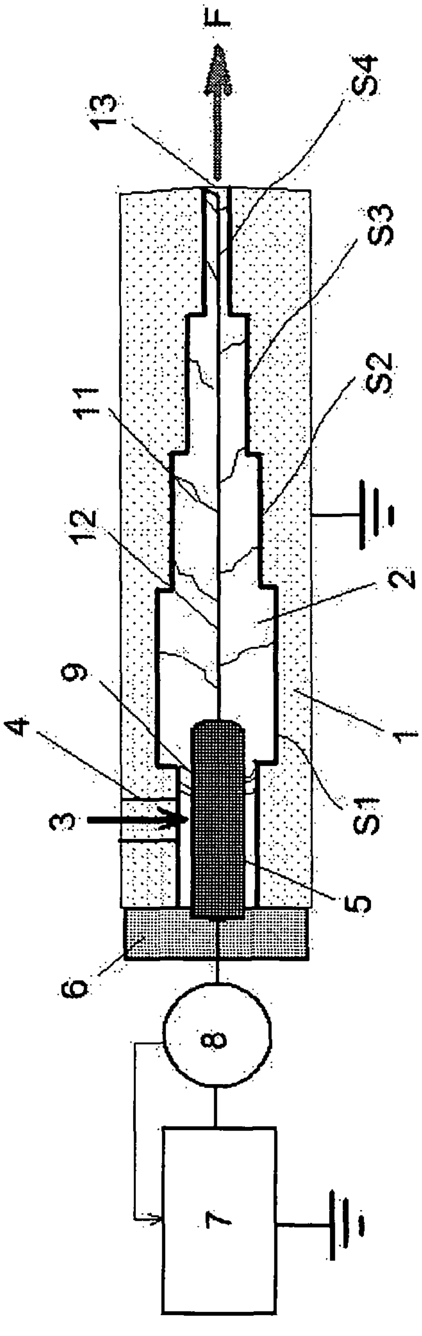
FIG. 1 shows a schematic, lateral and cross-sectional view of a device for generating a plasma flow according to the invention.

The device 10, shown in FIG. 1, has an electrically conductive housing 1, tubular in shape, connected to the earth, comprising an internal cavity joining its two ends, said cavity constituting an elongated central channel 2 inside whereof a vortex gas 3 circulates. The gas 3, for example air, is fed into the central channel 2 from an opening 4 formed in the lateral wall of the housing 1. The gas 3 is led to swirl by means of a swirling device (not shown) in such a way that the gas 3 flows inside the channel 2 forming a substantially helicoidal vortex around the longitudinal axis of the channel 2, merged with the longitudinal axis of the housing 1. At one of the ends of the housing 1, an insulating support 6 is mounted whereon a central electrode 5 with a stem shape is fixed, which penetrates coaxially the central channel 2. A source of high electric voltage 7, which can supply accordingly a direct voltage, an alternating voltage or a pulse voltage, is connected to the electrode 5 and to the earth. Moreover, a device 8 for measuring and regulating the current and the electric voltage connected between the voltage source 7 and the electrode 5 allows the control of the real voltage applied between the electrode 5 and the housing 1. In this way, in the configuration shown, the housing 1, made of a metal and itself connected to the earth, serves as a counter electrode in such a way that an electric discharge between the electrode 5 and the housing 1 can be caused. This electric discharge is produced initially in an ignition area 9, which is situated in the free space surrounding the electrode 5 and defined by the internal wall of the housing 1. The ignition area 9 will in general be positioned in proximity to the free end of the electrode 5 and downstream of the opening 4 so as to allow the gas 5 to move, along the axis of the housing 1, the micro electric arcs 11 formed at each discharge. In this way the micro arcs 11 extend in time along the entire length of the channel 2 and, due to a stabilisation by vortex of the flow of gas in the direction of the axis of the housing 1, form an almost stable wire-like arc 12 joining the electrode 5 to an end area 13 of the housing 1. This end area 13 may be similar for example to an end channel oriented along the longitudinal axis of the housing 1, said end channel opening out onto an open end through which the plasma flow exits. It can also have a more complex shape as will be seen in greater detail herein below with reference to FIGS. 2 to 4. Once the arc 12 is formed, the micro arcs 11 are formed between this arc 12 and the internal walls of the housing 1.

The basic structure of the device 10 as described above does not however allow the generation of a plasma flow of low temperature. In fact, in this basic structure, the electric arc 12 stabilises rapidly. The plasma flow is therefore generated without interruption so that a voltage V is maintained between the electrode 5 and the housing 1. This mode of operation induces the formation of a powerful and particularly hot plasma flow. Moreover, in this configuration, there is a high risk of the electric arc 12 forming directly between the electrode 5 and the object to be treated if the latter is metal. To remedy this, the Applicant had the idea of limiting the generation of the electric arc 12, more particularly by causing its withdrawal as soon as it reaches a limit area inside the housing 1. It is found that, in order to maintain a power sufficient for the plasma flow, it is advantageous to make this limit area coincide with the end area 13 mentioned previously.

At this stage two solutions can be foreseen for causing a withdrawal of the electric arc 12.

A first solution consists of first determining the real voltage Vcmax starting from which an electric arc is likely to be formed between the electrode 5 and the end area 13 of the housing 1. By controlling the real voltage Vr by means of the device 8, it is possible to determine at which moment Vr reaches the value Vcmax. The device 8 is then capable of sending a signal of interruption to the voltage source 7 in such a way as to produce a micro electric disconnection which leads to a withdrawal of the arc 12 as far as the ignition area 9. Afterwards, the re-establishing and maintaining of the voltage V produces again the expansion of the arc 12 as far as the end area 13 and, consequently, its withdrawal again. By proceeding in this way a non-balanced plasma flow is generated which is characterised by a relatively low temperature, more particularly comprised between 30° C. and 300° C.

A second solution consists of configuring the device for generating the plasma flow in such a way that an automatic withdrawal of the electric arc 12 is produced at the time when it reaches or approaches the end area 13. This result can be obtained in particular by using the particular structure of the housing 1 shown in FIG. 1. In this structure, the housing 1 has a channel 2 whose section, or mean diameter, decreases progressively from the ignition area 9 as far as the end area 13. This progressive decrease can in particular consist of segmenting the internal wall of the housing 1 into a series of successive tubular sections S1, S2, S3 and S4 of decreasing diameter and identical length. It was noted that this progressive decrease of the diameter of the channel 2 leads to a concomitant increase of the breakdown voltage of said sections S1, S2, S3 and S4, that is to say of the minimum electric voltage to be applied to develop an electric arc between the electrode 5 and said tubular sections S1, S2, S3 and S4. In this way, considering that the tubular section S4 corresponds to the end area 13 and that the breakdown voltage associated with this section S4 is Vcmin(0), it is sufficient to apply between the electrode 7 and the housing 1 a voltage V lower than Vcmin(0) to note that the electric arc 12 withdraws as soon as it reaches the end area 13. So as to maintain a relatively high power of the plasma flow, it may likewise be advantageous to allow an uninterrupted development of the electric arc 12 as far as the section S3 situated just before the end area 13. To do this, it is simply sufficient to choose the voltage V so that V is higher than or equal to Vcmin(−1), Vcmin(−1) corresponding to the breakdown voltage of section S3.

Referring to FIGS. 2*a* and 2*b*, a possible variant is shown of the end area which can be used in the device shown in FIG. 1.

In this variant, the end area 13 defines an end channel oriented along the longitudinal axis of the housing 1, said end channel opening out onto an open end 14 with a conical shape through which the plasma flow exits. In this way it is noted that the micro arcs 11 exit from the end channel 13 following the conical surface of said end 14. This uniform distribution of the micro arcs 11 at the surface of the cone generates in the end a wider and less intense plasma flow which allows a further reduction in its temperature and allows the device 10 to be used on a wider range of surfaces. In a preferred configuration of the invention it will be advantageous to configure the open end 14 in such a way that its conical shape defines partially a hyperboloid of revolution and that the ratio between the external diameter of the cone and the diameter of the internal wall of the housing 1 at the level of the end channel 14 is comprised between 2 and 20.

Referring to FIGS. 3*a* to 3*c*, a second possible variant is shown of the end area which can be used in the device shown in FIG. 1.

In this variant, the end area 13 defines an end channel oriented along the longitudinal axis of the housing 1, said end channel opening out onto a channel 15 open at its two ends 16 and forming an angle α with the longitudinal axis of the housing 1, the angle α being smaller than or equal to 90°. In the configuration shown, this angle α is substantially equal to 90°. In this way, the plasma flow F exits the housing 1 through two openings 16 formed on its lateral walls and in a direction transversal to the longitudinal axis of the housing 1. This configuration allows the plasma flow F to be applied more easily inside pipes or, more generally, inside hollow objects. Moreover, as shown in FIGS. 3*b* and 3*c*, it is equally conceivable to use the device 10 to treat wires 17 or any other threadlike object such as pipes or cables, suitable for being introduced inside the transverse channel 15. In this way, by passing through the channel 15, the wire 17 is in contact with the plasma flow F exiting the end channel 13. To improve further the distribution of the plasma flow F along the external wall of the wire 17, it will be advantageous to shift the axis of the transverse channel 15 in relation to the longitudinal axis of the housing 1. This arrangement in fact increases the aptitude of the plasma flow F to swirl inside the transverse channel 15.

Figure 4:
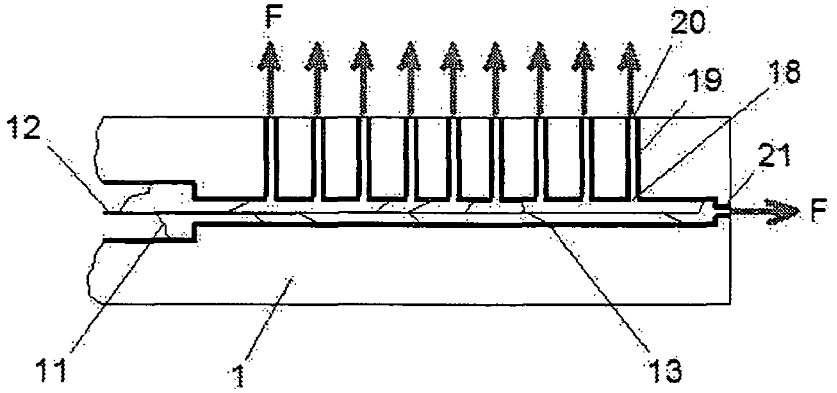
FIG. 4 shows a schematic, lateral and cross-sectional view of a third variant of an end area which can be used in the device shown in FIG. 1.

Referring to FIG. 4, a third possible variant is shown of the end area which can be used in the device shown in FIG. 1.

In this variant, the end area 13 defines an end channel oriented along the longitudinal axis of the housing 1, said end channel having a plurality of openings 18 opening out onto a plurality of transverse channels 19 oriented in a substantially perpendicular manner to the longitudinal axis of the housing 1 and whereof one of the ends 20 is open. The plasma flow F therefore exits through each of said open ends 20. This "comb" distribution of the plasma flow F therefore enables wide surfaces to be treated more easily. Moreover, given that the plasma flow exiting the openings 20 has an intensity which varies according to the position of the openings 20 in the end channel 13, it may be advantageous to form an additional opening 21 at the end of the end channel 13 so as to allow said plasma flow to exit partially through said opening 21 and thus render the intensity of the plasma flows exiting the openings 20 uniform.

For information, various examples of embodiments of the invention are given herein below.

Example 1

This example uses the device of the invention in its configuration shown in FIG. 1.

Working Parameters:

| | |
|---|---|
| Energy source | direct current |
| Electric voltage applied between the electrode and the housing | 3 kV |
| Carrier gas | air |
| Flow rate of the carrier gas | 60 l/min |
| External pressure | atmospheric |
| Diameter of the central electrode | 3 mm |
| Diameter of the central channel at the level of the ignition area | 4 mm |
| Diameter of section S1 | 8 mm |
| Diameter of section S2 | 6 mm |
| Diameter of section S3 | 4 mm |
| Diameter of section S4 | 2 mm |
| Length of each section | 35 mm |

Result:

A succession of development-withdrawal of an electric arc takes place between the central electrode and the section S4 at the frequency of 2 kHz.

Example 2

This example uses the device of the invention in its configuration shown in FIG. 1.

Working Parameters:

| | |
|---|---|
| Energy source | direct current |
| Electric voltage applied between the electrode and the housing | 2 kV |
| Carrier gas | N2/H2 |
| Flow rate of the carrier gas | 20 l/min |
| External pressure | atmospheric |
| Diameter of the central electrode | 3 mm |
| Diameter of the central channel at the level of the ignition area | 4 mm |
| Diameter of section S1 | 8 mm |
| Diameter of section S2 | 6 mm |
| Diameter of section S3 | 4 mm |
| Diameter of section S4 | 2 mm |
| Length of each section | 35 mm |

Result:

A succession of development-withdrawal of an electric arc takes place between the central electrode and the section S4 at the frequency of 1.5 kHz.

Example 3

Figure 2:
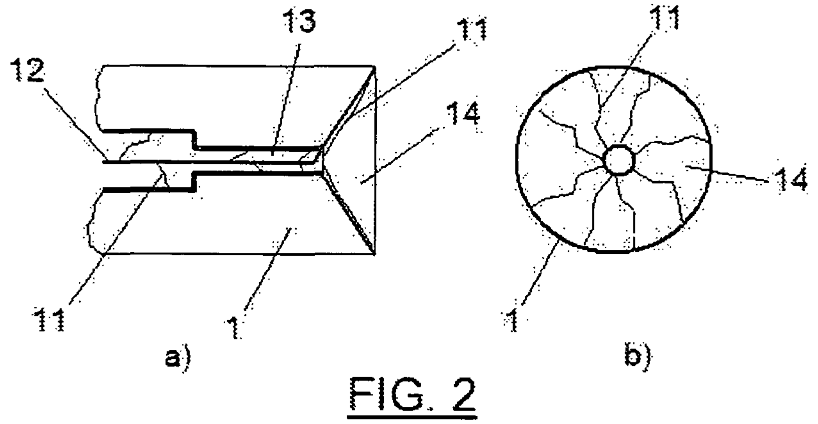
FIG. 2 shows a schematic, lateral and cross-sectional view of a first variant of an end area which can be used in the device shown in FIG. 1.

This example uses the device of the invention in its configuration shown in FIG. 2.

Working Parameters:

| | |
|---|---|
| Energy source | alternating current at frequency of 22 kHz |
| Electric voltage applied between the electrode and the housing | 3 kV |
| Carrier gas | air |
| External pressure | atmospheric |
| Flow rate of the carrier gas | 50 l/min |
| Diameter of the central electrode | 3 mm |
| Diameter of the central channel at the level of the ignition area | 4 mm |
| Diameter of section S1 | 8 mm |
| Diameter of section S2 | 6 mm |
| Diameter of section S3 | 4 mm |
| Diameter of section S4 | 3 mm |
| Length of each section | 10 mm |
| Diameter of the end channel | 3 mm |
| External diameter of the cone | 35 mm |

Result:

A succession of development-withdrawal of an electric arc takes place between the central electrode and the end of the cone at the frequency of 4 kHz.

Example 4

Figure 3:
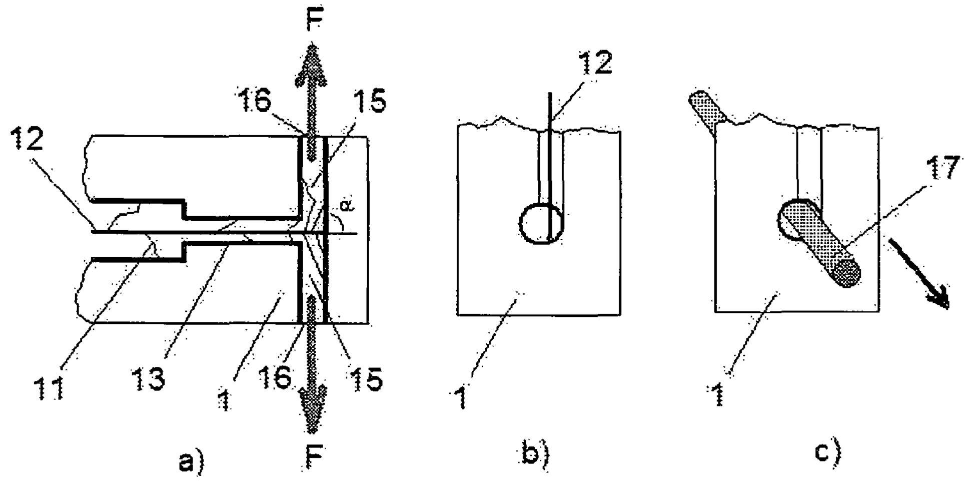
FIG. 3*a* shows a schematic, lateral and cross-sectional view of a second variant of an end area which can be used in the device shown in FIG. 1.
FIG. 3*b* shows a view from above of the end area shown in FIG. 3*a;*
FIG. 3*c* shows a view from above of the end area shown in FIG. 3*a*, in its position of use.

This example uses the device of the invention in its configuration shown in FIG. 3.

Working Parameters:

| | |
|---|---|
| Energy source | nonpolar pulsating current at frequency of 40 kHz |
| Electric voltage applied between the electrode and the housing | 6 kV |
| Carrier gas | air |
| External pressure | atmospheric |
| Flow rate of the carrier gas | 50 l/min |
| Diameter of the central electrode | 3 mm |
| Diameter of the central channel at the level of the ignition area | 4 mm |
| Diameter of section S1 | 8 mm |
| Diameter of section S2 | 6 mm |
| Diameter of section S3 | 5 mm |
| Diameter of section S4 | 4 mm |
| Length of each section | 15 mm |
| Diameter of the end channel | 4 mm |
| Diameter of the transverse channel | 4 mm |
| Distance between the longitudinal axis of the housing and the axis of the transverse channel | 2 mm |

Result:

A succession of development-withdrawal of an electric arc takes place between the central electrode and the section S4 at the frequency of 3 kHz.

Example 5

This example uses the device of the invention in its configuration shown in FIG. 4.

Working Parameters:

| | |
|---|---|
| Energy source | nonpolar pulsating current at frequency of 40 kHz |
| Electric voltage applied between the electrode and the housing | 6 kV |
| Carrier gas | air |
| External pressure | atmospheric |
| Flow rate of the carrier gas | 60 l/min |
| Diameter of the central electrode | 3 mm |
| Diameter of the central channel at the level of the ignition area | 4 mm |
| Diameter of section S1 | 8 mm |
| Diameter of section S2 | 6 mm |
| Diameter of section S3 | 5 mm |
| Diameter of section S4 | 5 mm |
| Length of each section | 20 mm |
| Diameter of the end channel | 5 mm |
| Length of the end channel | 150 mm |
| Diameter of the transverse channels | 1 mm |
| Distance between the axes of the transverse channels | 6 mm |
| Number of channels | 20 |
| Diameter of the additional opening | 1.5 mm |
| Thickness of the walls of the housing | 2 mm |

Result:

A succession of development-withdrawal of an electric arc takes place between the central electrode and the end channel at the frequency of 1 kHz. This configuration enabled jets of plasma to be obtained with identical density and oriented in a direction perpendicular to the axis of the central channel which enables wide surfaces to be treated.

The invention claimed is:

1. Device generating a plasma flow comprising an electrically conductive housing, tubular in shape, connected to the earth and forming a central channel traversed by a vortex gas, a central electrode arranged coaxially in said channel and an electric power source connected to the central electrode and to the earth, said electric power source being adapted to apply an electric voltage V between the electrode and the housing, wherein the mean diameter of the channel formed by the housing decreases progressively from an area situated substantially at the level of a free end of the electrode as far as an end area of said housing, wherein said end area defines an end channel oriented along the longitudinal axis of the housing, said end channel opening out onto an open end through which the plasma flow exits, wherein said open end has a section of conical shape and defines partially a surface in three dimensions described by the equation:

$$x^2/a^2+y^2/a^2-z^2/c^2=-1.$$

2. Device according to claim 1, wherein the internal wall of the housing defines a series of successive tubular sections of decreasing diameter.

3. Device according to claim 2, wherein said tubular sections have the same length.

4. Device according to claim 1, wherein the ratio between the external diameter of the cone defined by said open end and the diameter of the internal wall of the housing at the level of said end area is comprised between 2 and 20.

5. Device according to claim 1, wherein said end area defines an end channel oriented along the longitudinal axis of the housing, said end channel opening out onto a transverse channel open at its two ends and forming an angle α with the longitudinal axis of the housing, the angle α being smaller than or equal to 90°.

6. Device according to claim 5, wherein the angle α is substantially equal to 90°.

7. Device according to claim 5, wherein the axis of the transverse channel is shifted in relation to the longitudinal axis of the housing.

8. Device according to claim 1, wherein said end area defines an end channel oriented along the longitudinal axis of the housing, said end channel having a plurality of openings opening out onto a plurality of transverse channels oriented in a substantially perpendicular manner to the longitudinal axis of the housing and whereof one of the ends is open.

9. Device according to claim 1, wherein the electric voltage generated by the electric power source is chosen in the group made up of direct voltages, pulse voltages and alternating voltages in the entire frequency range.

10. Device according to claim 1, wherein the vortex gas is air.

11. Method for generating a plasma flow by means of a device generating a plasma flow comprising an electrically conductive housing, tubular in shape, connected to the earth and forming a central channel traversed by a vortex gas, a central electrode arranged coaxially in said channel and an electric power source connected to the central electrode and to the earth, said electric power source being adapted to apply an electric voltage V between the electrode and the housing, comprising the following steps:

a) application of an electric voltage V between the electrode and the housing in such a way as to produce an electric arc between the central electrode and an area of the internal wall of the housing surrounding said electrode;

b) maintaining of said electric voltage V so as to generate said electric arc by means of the vortex gas as far as an end area of the central channel;

c) continuous measurement of the real electric voltage Vr between the central electrode and the housing and disconnection of the voltage V as soon as the voltage Vr is substantially equal to a value Vcmax corresponding to when the electric arc reaches said end area;

d) repetition of the previous steps a), b) and c).

12. Method according to claim 11, wherein, at step c), the disconnection is done by a means of interruption of the electric power source.

13. Device generating a plasma flow comprising an electrically conductive housing, tubular in shape, connected to the earth and forming a central channel traversed by a vortex gas, a central electrode arranged coaxially in said channel and an electric power source connected to the central electrode and to the earth, said electric power source being adapted to apply an electric voltage V between the electrode and the housing, wherein the mean diameter of the channel formed by the housing decreases progressively from an area situated substantially at the level of a free end of the electrode as far as an end area of said housing, wherein said end area defines an end channel oriented along the longitudinal axis of the housing, said end channel having a plurality of openings opening out onto a plurality of transverse channels oriented in a substantially perpendicular manner to the longitudinal axis of the housing and whereof one of the ends is open.

14. Device according to claim 13, wherein said end channel opens out onto an open end through which the plasma flow exits partially.

* * * * *